US012160509B2

United States Patent
Hammon

(10) Patent No.: US 12,160,509 B2
(45) Date of Patent: Dec. 3, 2024

(54) CRYPTOGRAPHIC SYSTEMS AND METHODS FOR MAINTENANCE OF POOLS OF RANDOM NUMBERS

(71) Applicant: 7Tunnels Inc., Park City, UT (US)

(72) Inventor: Michael L. Hammon, Ames, IA (US)

(73) Assignee: 7Tunnels Inc., Park City, UT (US)

( * ) Notice: Subject to any disclaimer, the term of this patent is extended or adjusted under 35 U.S.C. 154(b) by 281 days.

(21) Appl. No.: 17/802,112

(22) PCT Filed: Jan. 31, 2021

(86) PCT No.: PCT/US2021/015959
§ 371 (c)(1),
(2) Date: Aug. 24, 2022

(87) PCT Pub. No.: WO2021/173304
PCT Pub. Date: Sep. 2, 2021

(65) Prior Publication Data
US 2023/0082077 A1      Mar. 16, 2023

Related U.S. Application Data

(60) Provisional application No. 62/982,886, filed on Feb. 28, 2020.

(51) Int. Cl.
| | | |
|---|---|---|
| H04L 9/08 | (2006.01) | |
| G06F 7/58 | (2006.01) | |
| G06F 21/60 | (2013.01) | |
| H04L 9/06 | (2006.01) | |
| H04L 9/12 | (2006.01) | |

(52) U.S. Cl.
CPC ................. H04L 9/0869 (2013.01)

(58) Field of Classification Search
CPC ....... H04L 9/0869; H04L 9/0656; H04L 9/12; G06F 21/602; G06F 7/58
See application file for complete search history.

(56) References Cited

U.S. PATENT DOCUMENTS

| | | | |
|---|---|---|---|
| 7,209,561 B1 * | 4/2007 | Shankar | H04L 9/12 380/46 |
| 10,027,640 B2 | 7/2018 | Avanzi et al. | |
| 2010/0246811 A1 * | 9/2010 | Sadler | G06F 21/6209 726/2 |
| 2010/0250968 A1 * | 9/2010 | Sadler | H04L 9/0863 713/193 |
| 2016/0315763 A1 * | 10/2016 | Hammon | H04L 9/0656 |
| 2017/0034167 A1 | 2/2017 | Figueira | |
| 2017/0237558 A1 * | 8/2017 | Yuan | H04L 9/12 380/279 |

(Continued)

FOREIGN PATENT DOCUMENTS

WO      2019040909 A1     2/2019

OTHER PUBLICATIONS

PCT International Patent Application No. PCT/US2021/015960, International Search Report and Written Opinion Mailed Apr. 14, 2021, 8 pp.

*Primary Examiner* — Darren B Schwartz
(74) *Attorney, Agent, or Firm* — BKRIP LLC

(57) ABSTRACT

Systems and methods include a random number pool where one or more sets of key data elements of the random number pool are transmitted and added or replaced with another set of key data elements.

22 Claims, 4 Drawing Sheets

(56) References Cited

U.S. PATENT DOCUMENTS

| | | | |
|---|---|---|---|
| 2017/0353302 A1* | 12/2017 | Fernandez | H04L 9/14 |
| 2018/0248692 A1* | 8/2018 | Henderson | H04L 9/0861 |
| 2020/0336301 A1* | 10/2020 | McCarthy | H04L 9/0877 |

* cited by examiner ature of various embodiments. While the various aspects of
CRYPTOGRAPHIC SYSTEMS AND METHODS FOR MAINTENANCE OF POOLS OF RANDOM NUMBERS

PRIORITY CLAIM

This application claims the benefit of the filing date of U.S. Provisional Patent Application Ser. No. 62/982,886, filed Feb. 28, 2020, for "CRYPTOGRAPHIC SYSTEMS AND METHODS FOR MAINTENANCE OF POOLS OF RANDOM NUMBERS," the disclosure of which is hereby incorporated herein in its entirety by this reference.

TECHNICAL FIELD

Embodiments of the present disclosure relate generally to cryptography and more specifically to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt, but can eventually be broken. Other types of encryption have significant vulnerabilities making decryption relatively easy. Conventional one-time pads are generally considered completely secure and unbreakable.

However, conventional one-time pads have a drawback related to how to convey the one-time pads to keep them secret. Moreover, for conventional one-time pads, the length of the key is equal to the length of the data to be encrypted, which may be unsuitable for high-bandwidth applications even if secure conveyance of the one-time pad is possible.

DETAILED DESCRIPTION

Figure 1:
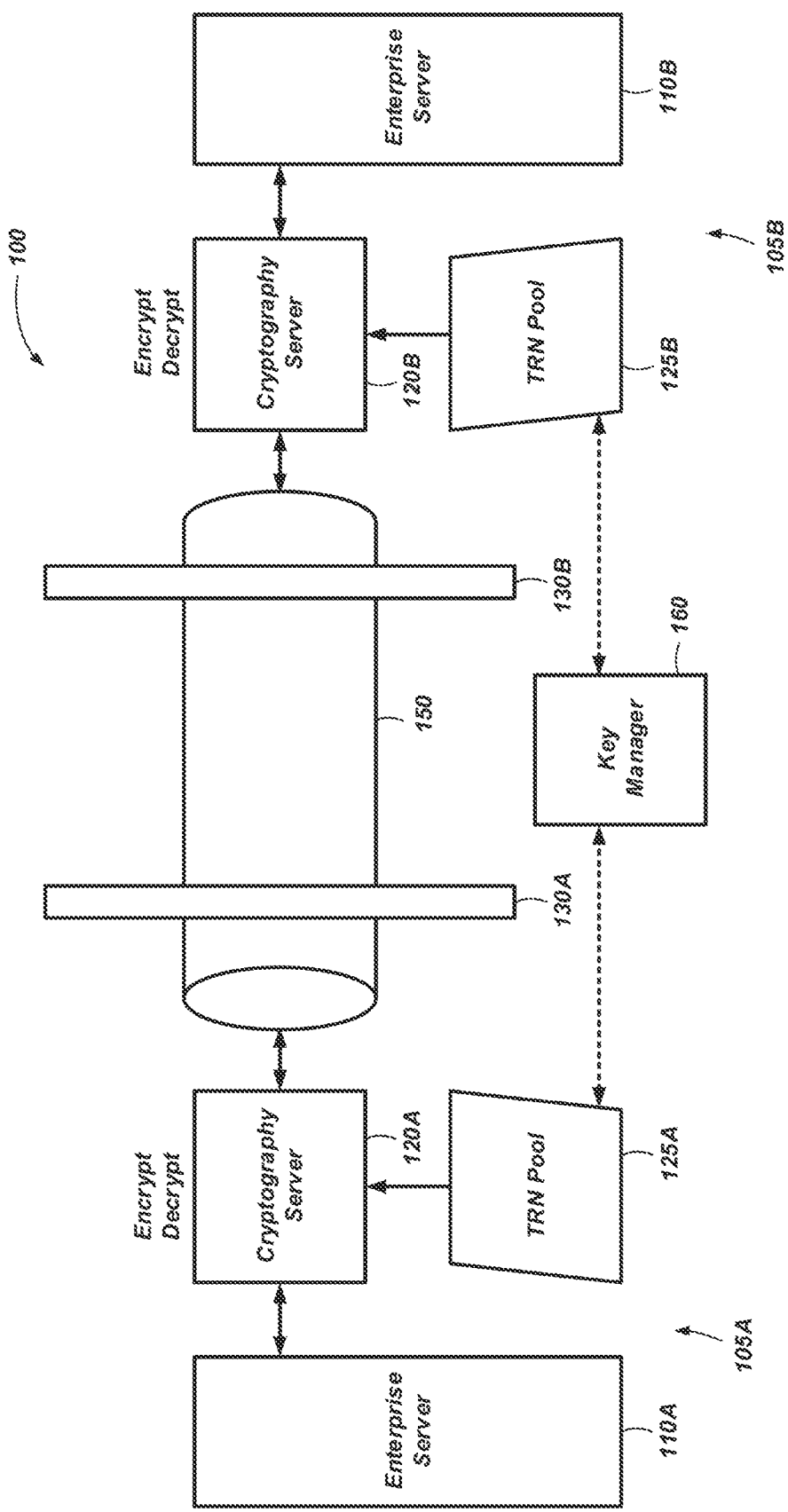
FIG. 1 is a block diagram of an encryption system using random number pools in accordance with embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representhe embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated for a given instantiation by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings may be included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, at least 99% met, or even 100% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

A "module" may mean a software process, a collection of software processes, a collection of hardware elements, or a combination thereof configured to implement one or more elements of the present disclosure.

Before describing specific embodiments, and in order to facilitate description in the present disclosure, various terms are described herein in relation to some embodiments. Where ambiguity may exist between the plain meaning, dictionary meaning, and the term as described herein, a person of ordinary skill in the art will recognize the term as described herein will best conform to a more comprehensive understanding of embodiments of the present disclosure.

A "one-time pad" (OTP) is an unbreakable encryption technique in which identical paired sets of key material are distributed to two communicants prior to their need for encrypted communication. When needed, a portion of the OTP is used by the sending communicant to encrypt a message and the matching portion is used by the receiving communicant to decrypt the message. In early implementations, OTPs were literal pads of paper with random single-letter substitutions, and after portions of one or more pages in the pad were used to encrypt a message the pages could be removed from the pad and destroyed to prevent decryption of the message by anyone other than the recipient with the matching pad.

A "Random Cipher Pad" (RCP) is similar to, but different from, an OTP according to embodiments of the present disclosure. The term RCP may be used as a generic term for various species of RCPs. An RCP is a collection, which may be a file, of truly random numbers, e.g., gathered from one or more "True Random Number Generators" (TRNGs) or from other random number sources. The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. In some embodiments, each RCP within an RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID or another addressing method. Moreover, while a simple sequential identifier may be used to identify each RCP within an RCP pool, a GUID, a hash of the RCP, or other type of unique identifier may be used instead to identify each RCP within an RCP pool.

A "True Random Number Generator" (TRNG) is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and radio frequency (RF) noise.

While embodiments of the disclosure are generally described with reference to truly random numbers and a TRNG, in other embodiments, other type of random number configurations and associated generators may be utilized.

A "True Random Number (TRN) pool" is a set of true random numbers generated by a TRNG hardware device, and associated software if needed. A quantum random number (QRN) pool is a species of a generic random number pool wherein the true random numbers in the pool are generated by a quantum process. The terms "set" and "pool" may be used interchangeably within this description. In other words, this description may use random number pool and random number set interchangeably and QRN pool and QRN set interchangeably. In addition, a random number pool may be configured as a pool of individually selectable and addressable RCPs such as the RCP pool described above. In some embodiments, any of these pools may be utilized to define the random number pool(s) discussed herein.

A "data RCP" is a species of RCP used to encrypt and decrypt communications between two or more endpoints.

A "Random Cypher Key" (RCK) is a data RCP, a portion of a data RCP, a combination of two or more data RCPs, or a combination of portions of two or more data RCPs such that the RCK has a length corresponding to a length of a message that is to be operated on by the RCK.

A "key RCP" is a species of an RCP used to encrypt and decrypt another RCP (e.g., a data RCP), or portion thereof, to securely transfer it electronically. In some embodiments, each key RCP will generally only be used once and retired.

"Mapping" is a process of moving through an RCP, RCP pool, or portion thereof.

A "mapping index" is a list of numbers that includes the integers from one through a number of units (e.g., bits, bytes, words, etc.) in an RCP or RCP pool in random order. The mapping index may be encrypted and sent to the appropriate endpoints of a particular communication channel.

The terms "unencrypted," "unencrypted data," "unencrypted data structure," "unencrypted message," "clear text," and "plain text" refer to data that is not encrypted.

The terms "encrypted," "encrypted data," "encrypted data structure," "encrypted message," and "cipher text" refer to data that has passed through an encryption process according to embodiments of the present disclosure. As a non-limiting example, encrypted data may be generated by performing a bitwise exclusive-OR (XOR) between a plain text message and a random number from a random number pool.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same random number from a random number pool that was used to encrypt the plain text message. Decrypted data may also be referred to as "clear text," or "plain text." Thus, plain text and clear text may refer to data before encryption or data after decryption.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to an RCP according to embodiments of the present disclosure. In contrast, a conventional one-time pad is explicitly referred to as a conventional one-time pad or a one-time pad and not simply as a pad.

Implementation Overview

Embodiments described herein facilitate utilization of Random Cipher Pads (RCPs), which may be somewhat similar to conventional one-time pads, but used in new and different ways. The RCPs may be used to encrypt information (for example, documents, media streams, and data files) and/or may be utilized to facilitate the encryption of subsequent, RCPs that may replace used RCPs and, in turn, used by the original users for further encryption/decryption processes. For example, an RCP may be utilized to populate a key RCP that is utilized to encrypt and transfer a replacement RCP for later use. Moreover, embodiments of the present disclosure include processes to provide and/or replenish a pool of RCPs, which may be particularly useful in high-bandwidth applications.

Conventional one-time pad encryption is generally recognized as being unbreakable. Similarly, the use of RCPs is unbreakable under the condition that (1) the RCPs are securely distributed to the communication endpoints, or (2) a transfer process for generating and distributing additional RCPs is secure and unbreakable. Therefore, an endless number of RCPs can be securely used by the communicants as long as the party generating the RCPs continues to send subsequent RCPs encrypted by the preceding RCPs and the used RCPs are rendered undiscoverable, unusable, unreadable, otherwise inaccessible, or destroyed.

In some embodiments, the initial RCP exchange installation is done "outside" the electronic environment, or done in a highly secure manner with full authentication of sender and recipient. This results in a situation where each subsequent RCP cannot be decrypted and therefore cannot be intercepted for use.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use may be impractical, costly, and inefficient; plus, the method of getting each successive pad into one or more recipients' hands may create vulnerabilities.

In situations where replenishment by manual methods is impractical or limited, the existing RCP may be supplied (e.g., provided, replenished, replaced) according to embodiments of the present disclosure.

The following aspects, presented in separate or cumulative embodiments, present functionality opportunities possible with RCP encryption methods or processes. In general, one or more pools of RCPs may be used for data encryption and also used for replenishing the one or more pools. In other words:

1. A first RCP from an RCP pool may be used in an encryption and/or decryption process.
2. A replacement RCP may be generated (e.g., by a TRNG), encrypted by a second RCP from the RCP pool, sent to one or more clients, and decrypted in order to replace the first used RCP. The replacement RCP may also be stored locally in the RCP pool.
3. Data relating to the second RCP may be utilized to develop a key RCP (e.g., an uncorrelated key RCP) that is used to encrypt another replacement RCP that is generated and transmitted (e.g., to one or more clients) to replace the second RCP in the RCP pool. As above, the replacement RCP may also be stored locally in the RCP pool.

4. Multiple new RCPs can be generated and securely transmitted (e.g., along with the documents or information they encrypt or separately) by the original user(s) utilizing synchronized data on individual computing devices. Such generation of RCPs may be utilized to replace used RCPs on two or more computing devices that are in communication with each other.

Stated another way, embodiments of the present disclosure include systems, apparatuses, and methods for providing cryptographic procedures including utilizing a RCP for encryption/decryptions and also transforming the same RCP into uncorrelated random key material elements (e.g., as a key RCP) that may then be used for securely passing replacement RCPs. These embodiments may assist in reducing and/or eliminating attack surfaces.

In some embodiments, some or all of the encryption features described herein are implemented within a computer processor or processing device that executes the encryption procedures. The transformation of data that occurs according to the specific encryption techniques described herein render the processing device executing embodiments described herein as a special-purpose processing device capable of new functionality that is otherwise not available executing conventional software or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

It is a characteristic of RCP encryption that if an exclusive-OR (XOR) operation is used to encrypt the data then applying the exclusive XOR a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

In some embodiments, RCP generation takes place on the computer that has the greatest resources, either on the sender's computer or on the recipient's computer. In additional embodiments, the RCP generation may be performed by a third-party intermediary computer or reference computer (e.g., an RCP server) and delivered in a secure fashion to each of the computers wishing to communicate with each other over a secure channel.

RCP sizes may vary in different implementations, or even over different stages of the same communications stream between sender and receiver devices.

For ease of description, data elements are generally described in terms of "bytes." However, a person of ordinary skill in the art will recognize that the data elements may be configured in many sizes suitable to different applications, such as, for example, 16, 32, or 64-bit words.

Embodiments of the present disclosure enable user modification of a given pool of key material being used for the 1) symmetric encryption/decryption (also referred to herein as symmetric cryptography) of user data and 2) symmetric cryptography of random data produced for dynamic replacement of key data used for symmetric cryptography of user data. Details of this symmetric cryptography for user data and dynamic replacement of key data may be found in U.S. patent application Ser. No. 15/134,260 filed Apr. 20, 2016 and entitled "Random Cipher Pad Cryptography" and U.S. patent application Ser. No. 16/637,806 filed Feb. 10, 2020 and entitled "Cryptographic Systems and Methods For Extending Apparent Size of Pools Of Truly Random Numbers," the entire disclosure of each of which is hereby incorporated by reference in its entirety.

Implementation Details

FIG. 1 is a block diagram of a cryptography system 100 using synchronized RCP pools 125A, 125B with a communication channel 150 (e.g., a wired channel, such as data pipe, which may be a high-volume data pipe, a wireless channel, bidirectional tunnel, combinations thereof, etc.).

In some embodiments, the system in FIG. 1 may be configured as router-to-router (R2R) system. However, it should be understood that this system may use routers, servers, gateways, or other suitable devices for communicating with multiple clients, encrypting/decrypting client message traffic and sending/receiving encrypted messages through the communication channel 150. Embodiments using R2R hardware and/or software act as a specialized solution for select applications where message traffic is being exchanged between many users in two distributed locations. Similarly, embodiments using servers on one or both ends include hardware and/or software as a specialized solution for select applications where server resources are used at one or both of the distributed locations. Encryption is applied at each router as traffic enters or departs. The routers become single endpoints, paired exclusively with each other and shared by many on either end. This system may be more appropriate for operations where both ends are contained within a secure environment because all traffic between senders and their corresponding router may be in plaintext and subject to exploitation if intercepted.

Embodiments of the present disclosure may include encryption solutions to autonomously and seamlessly encrypt data while under user control (e.g., within a firewall), transfer the data, and then decrypt the data (e.g., within another firewall) at the other end moving data back onto a computing device (e.g., server 110A, 110B) for distribution.

For example, as shown in FIG. 1, one or more computing devices (e.g., cryptography servers or devices 120A, 120B) may be located within an entity firewall 130A, 130B, such as, for example, a corporate firewall at each end of the communication channel 150. Depending on the flow of data, the computing devices may be broadly and non-limitingly labeled as a server or generic device; however, in some instances, these devices may effectively act as variations of a server and a client, one or more clients, or a server and multiple clients. For example, cryptography server 120A may act as a server as it provides one or more RCPs to a cryptography server 120B as a client, and vice versa. By way of further example, cryptography servers 120A, 120B may act as clients to another main server that provides one or more RCPs (e.g., synchronous RCPs) to the cryptography servers 120A, 120B.

In some embodiments, the cryptography server 120 and the server 110 may be different physical servers or computing devices. In other embodiments, the cryptography server 120 and the server 110 may be configured as separate processes in communication with each other on a single physical hardware device.

Figure 2:
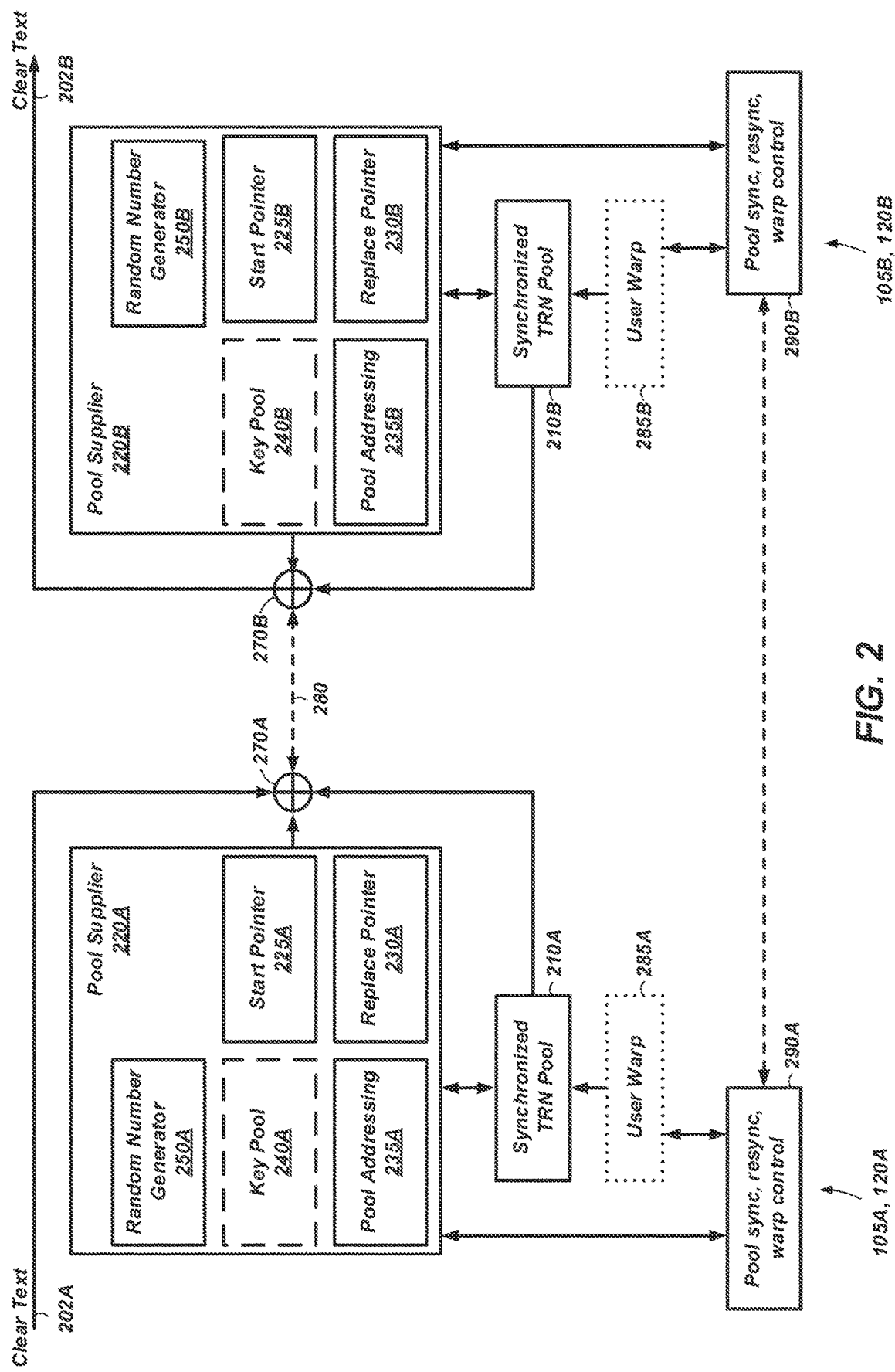
FIG. 2 is a more detailed block diagram illustrating elements on a cryptography server using a random number pool in accordance with embodiments of the disclosure.

Element numbers in FIGS. 1 and 2 include an appended "A" or "B" to indicate similar blocks, modules, and functions on each side of a communication system. Thus, drawing elements may be referred to with their generic number without the appended "A" or "B" when describing functions that are similar on each end. Encryption may take place on the cryptography server 120 as one of the last operations when data leaves a sending device 105A before entering the communication channel 150. Conversely, decryption may take place on the cryptography server 120 as one of the first operations when data exits the communication channel 150 at a receiving device 105B. The cryptography server 120 may be coupled to the server 110, which collects plain text traffic to be encrypted on the sending device 105A or distributes plain text traffic to the designated recipient(s) after decryption on the receiving device 105B. Each cryptography server 120 is connected to or includes data storage which contains an RCP pool (e.g., a True Random Number Pool (TRNP) 125A, 125B), which may be preloaded on each server 120. With embodiments of the present disclosure these TRNPs 125 on each side are identical and can be synchronized to provide True Random Numbers (TRNs) used as encryption keys and decryption keys. The TRNPs 125 may be replenished on a routine basis by an out-of-band key manager 160 supplied from a remote system and/or may be replenished by one or more of the servers 120 as discussed herein. Various high security features may be built into this system to prevent compromise on control or replenishment of the TRNPs 125.

Embodiments of the present disclosure enable modification (e.g., replenishment, replacement, population, etc.) of a given pool of key material elements being used for the symmetric cryptography of data. In maintaining a given pool of key material, random bytes or bits of key material may be initially populated and/or replaced as the key material is utilized (e.g., in ongoing or periodic processes). As a result, embodiments of the present disclosure may be utilized to reach or approximate the security of a one-time pad where bytes are never reused and are replaced and shared securely between computing devices. Such embodiments are more secure than Private Key Infrastructure (PKI) encryption methods and may also be Quantum Proof.

FIG. 2 is a more detailed block diagram illustrating elements on the cryptography servers 120 using pools of key material elements (e.g., RCP pools, such as TRN pools 210A, 210B). In general, each cryptography server 120 operates in a similar manner except that one side is encrypting clear text data elements 202A as an input to an encryption operation 270A (e.g., a bitwise XOR) to create encrypted data elements 280 and the other side is decrypting the encrypted data elements 280 using a decryption operation 270B (e.g., a bitwise XOR) to create clear text data elements 202B as an output. Of course, communication is two-way and although encryption and transmission is shown from A to B (left to right) in FIG. 2, encryption and transmission will generally flow both directions and may flow through other devices (e.g., such as an encryption server managing communications and additional encryption between the endpoints).

A first copy 210A and a second copy 210B of the synchronized TRN pools 210A, 210B may be substantially identical and a pool sync/resync module 290 may be included to ensure that the same key material elements within the synchronized TRN pool 210 are selected and used at the same time on each side.

Embodiments of the present disclosure may maintain a given TRN pool 210 being used for symmetric cryptography by providing one or more pool suppliers 220A, 220B that define a substantially random method of replenishing the truly random numbers (e.g., also referred to herein as key material elements, key data elements, or key elements) in the TRN pools 210 either as an initial population of the TRN pools 210 or through replacement of the key material elements as the elements are utilized in an encryption and/or decryption process and retired. In some embodiments, the synchronized TRN pools 210 would be delivered to each side in a secure manner, such as, for example, by trusted courier, tamper evident packaging, or other suitable secure communication channel. In additional embodiments, the TRN pools 210 may be partially or entirely populated utilizing the methods disclosed herein.

While FIG. 2 illustrates a pool supplier 220 on each device or server 120, in other embodiments, one (or more) pool suppliers 220 may provide key material elements to one or both of the servers 120. For example, the pool supplier 220 may be provided on an external server, where the servers 120 are supplied (e.g., as clients) key material elements to respective TRN pools 210. In additional embodiments, the pool supplier 220 may only be provided one or more servers 120 where the pool supplier 220 provides all initial and/or replenishment key material elements to the other servers 120, which may lack a pool supplier 220.

The pool supplier 220 provides one or more randomizing processes for selecting key material elements from the synchronized TRN pool 210, which, in some embodiments, may be in a substantially random manner, but also reproduceable, such that the sending device 105A and the receiving device 105B of FIG. 1 may stay in synchronization to select and/or modify the same key data elements from the TRN pools 210.

The pool supplier 220 may include one or more pointer modules for marking select locations in the TRN pool 210 as the processes move through the TRN pool 210 utilizing the key material elements. For example, a start pointer 225A, 225B and replace pointer 230A, 230B may be utilized to identify select locations (e.g., addresses) in the TRN pool 210 as encryption, decryption, and/or populate/replenishment operations are performed. As discussed below in greater detail, the start pointer 225 may designate a start point (e.g., an address of the first key material element) in the TRN pool 210 to be utilized in the next encryption/decryption process. The replace pointer 230 may designate a start point (e.g., an address of a first key material element or empty key material element location) in the pool 210 to be utilized in a process where the pool supplier 220 is populating/replenishing key material elements in the TRN pool 210.

A pool addressing module 235A, 235B may address (e.g., in unison with one or more of the pointers 225, 230) one or more individual key material elements within the synchronized TRN pool 210 and/or another optional pool (e.g., key RCP pool 240A, 240B). In some embodiments, the key RCP pool 240 and TRN pool 210 may be a single pool, but may be considered distinct where key elements for encryption/of user data are provided from the TRN pool 210 portion and key elements for encryption/decryption of other RCPs (e.g., replacement RCPs) are provided from the key pool 240 portion.

A random number generator 250A, 250B (e.g., a TRNG) may be included to implement a number generation process to create random numbers to provide one or more key material elements to the synchronized TRN pool 210. For example, as discussed below, the random number generator 250 may provide new random key material elements to the TRN pools 210. Such key material elements may be provided locally (e.g., directly to the respective local TRN pool 210A) without encryption. However, additional RCPs may be utilized (e.g., RCPs developed from the TRN pool 210 and/or the key RCP pool 240) to encrypt (e.g., at encryption operation 270A) and send the replacement key material elements to the TRN pool 210B of the other server 120.

As depicted, a warping module 285 may optionally be included in some embodiments. There may be cases where an unauthorized internal or external actor is able to obtain a copy of Random Cipher Pads (RCP) or the TRN pool 210 by some means or able to otherwise ascertain contents of the TRN pool 210. There may be other cases where the client desires to modify the TRN pools 210 after the TRN pools 210 have been provided by a supplier of the TRN pools 210 (e.g., in case data of the supplier is compromised or is otherwise ascertained by third parties). Some embodiments may enable a process for performing a user-specific modification of the TRN pool 210 (also referred to herein as warping or performing a warp operation). Once the warp has been implemented, only the client users will be able to decrypt any traffic. At that point, the TRN provider has irrevocably turned total and complete control of the key data elements in the TRN pool 210 over to the client. Examples of such a warping proceeding are disclosed in, for example, U.S. Provisional Patent Application Ser. No. 62/617,984, filed Jan. 16, 2018 and entitled "Cryptographic Systems and Methods for Modification of Pools of Truly Random Numbers," the disclosure of which is hereby incorporated herein in its entirety by this reference.

Figure 3:
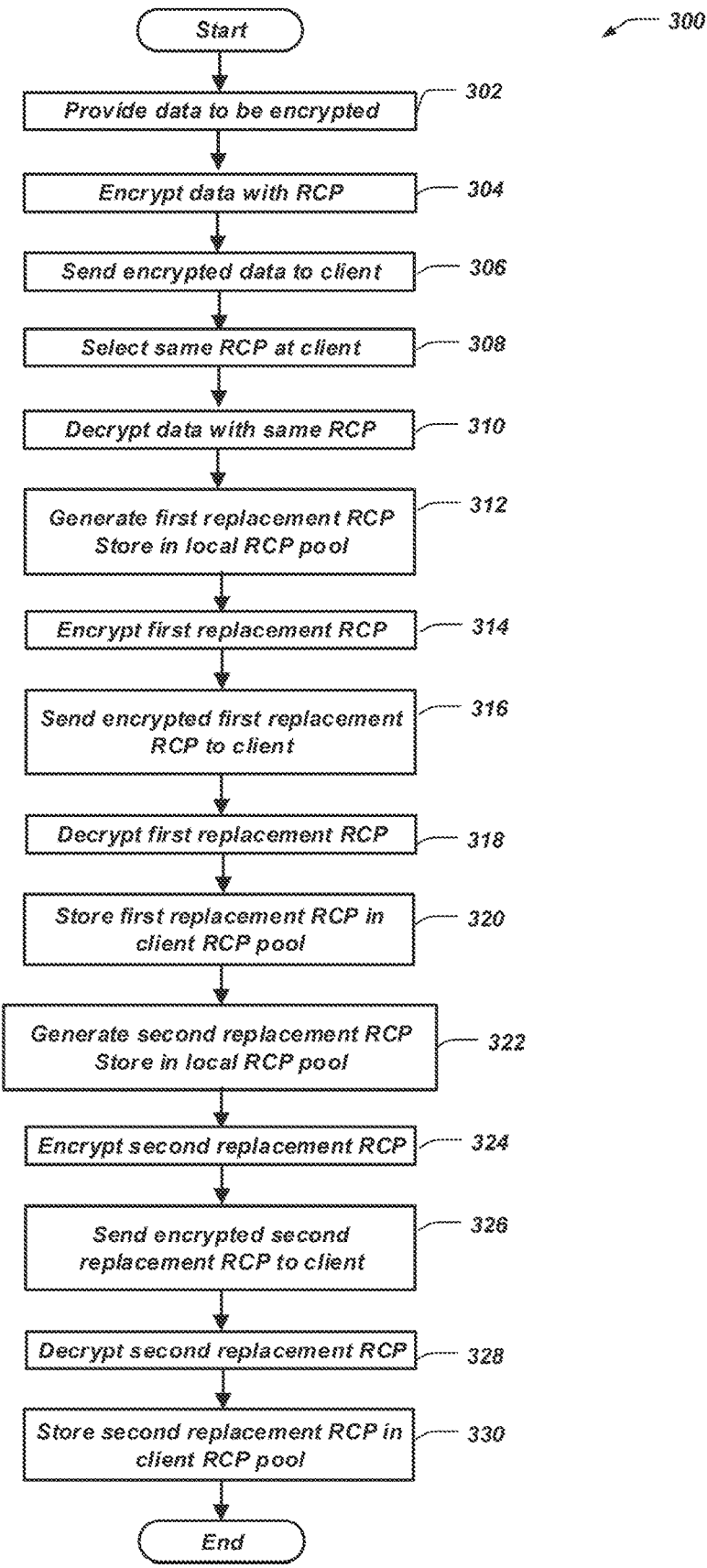
FIG. 3 illustrates processes for producing and/or replenishing a random number pool in accordance with embodiments of the disclosure.

As discussed above, embodiments of the present disclosure may encrypt: 1) user data as well as 2) produce and encrypt random data produced for dynamic replacement of key data that can later be used for symmetric cryptography of user data. FIG. 3 illustrates processes for producing and/or replenishing a random number pool.

As shown in FIG. 3, process 300 begins at process block 302 where data to be encrypted is provided to a device or server. The data may be clear text data (e.g., user data, user messages) to be encrypted and/or key material elements to be encrypted (e.g., to populate and/or replenish an RCP pool).

At process block 304, the server selects a number of key material elements (e.g., an RCP) from the RCP pool (e.g., starting at a start pointer) corresponding in length to the size of the data to be encrypted in process block 302. The server encrypts the data using the selected key material elements. The key material elements utilized in the encryption may be retired (e.g., marked as used, deleted, removed, overwritten, etc.). The start pointer may be advanced to the next key material element (e.g., the next unused element) or to a random key material element for the next encryption and/or decryption process.

At process block 306, the server sends the encrypted data to another device or server (e.g., a client). At process block 308, the client device may select the same key material elements (e.g., from a synchronized pool at a start pointer) and decrypts the data at process block 310. As above, the key material elements utilized in the decryption may be retired (e.g., marked as used, deleted, removed, overwritten, etc.). The start pointer may be advanced to the next key material element (e.g., the next unused element) or to a random key material element for the next encryption and/or decryption process.

It is noted that while the servers or devices may be synchronized, certain data relating to the cryptography processes herein may be passed back and forth (e.g., in headers) to indicate one or more values relating to the synchronized processes (e.g., a starting address, a step size, an identification of a certain RCP to be utilized, etc.). Even if such information is intercepted, the underlying encrypted data may still not be compromised without knowledge of the synchronized RCP pools stored on the devices.

Each RCP pool should symmetrically include a number of key material elements that have been used. In some embodiments, the key material elements (e.g., the prior RCP) may only be utilized once and then are to be retired and replaced. In additional embodiments, the key material elements may be reutilized one or more times in the same string or randomly interspersed in subsequent strings of key data elements.

One of the servers or devices, or an external server or device, may initiate an operation to replenish the synchronized pools in a dynamic manner (e.g., overwriting the used RCPs). In embodiments where such a process is utilized to initially populate the pool, such a process will begin at this point (e.g., at process block 312 rather than process block 302). In some embodiments, one or more the computing devices may carry out the process in FIG. 3 in series as depicted. In additional embodiments, one or more the computing devices may carry out the process in FIG. 3 in one or more individual sections (e.g., as parallel processes). For example, the cryptographic process (e.g., encryption/decryption) of process blocks 302 through 310 may be implemented one or more times independent of the replenishment process of process blocks 312 through 330. Stated in another way, computing systems may execute both the encryption/decryption processes and the replenishment processes at the same time with different resource allocations of the system. Further, one of the processes may be performed without the other. For example, the replenishment process of process blocks 312 through 330 may be looped until the pool is entirely replenished or populated to a desired amount.

At process block 312, the server may generate a new string of random numbers (e.g., from a random number generator 250 (FIG. 2)). This new string of random numbers may be utilized to replenish the RCP pools (e.g., locally and then encrypted and sent to one or more synchronized clients). After replenishment, a pointer (e.g., replace pointer 230 (FIG. 2)) may be moved to the next portion of the pool to be replenished, if applicable. It is noted that when moving through the RCP pools in uniform manner, the portion of the RCP pool to be replaced may extend between the replace pointer and the start pointer as the pool supplier continues to replace key material elements after the elements have been utilized in an encryption/decryption process.

At process block 314, the new string of random numbers is encrypted before being sent to one or more synchronized clients to keep the RCP pools in substantial unity. Such encryption may be accomplished with an RCP from one or more sources (e.g., derived from a previously utilized or developed RCP and/or from an existing separate pool, such as the key RCP pool 240 (FIG. 2), or from other variables). For example, this first replacement RCP may be encrypted using another RCP (e.g., a second RCP) selected from one of the existing pools (e.g., the TRN pool 210 (FIG. 2), the key RCP pool 240 (FIG. 2)).

At process block 316, the client(s) receive the encrypted first replacement RCP. As the client is synchronized, it is able to obtain the same second RCP to now decrypt the replacement RPC at process block 318. Once decrypted, the replacement RCP may be added to the RCP pool locally at the client and utilized for future operations at process block 320. The replace pointer may be advanced as above.

The second RCP may be retired on the server and/or the client(s) (e.g., marked as used, deleted, removed, overwritten, etc.). For example, at process block 322, one or more of the computing systems (e.g., the server) may generate a second new string of random numbers (e.g., from a random number generator 250 (FIG. 2)). This second new string of random numbers may be utilized to replenish the second RCP taken from the RCP pools (e.g., locally and then encrypted and sent to one or more synchronized clients).

At process block 324, the second replacement RCP is encrypted before being sent to one or more synchronized clients to keep the RCP pools in substantial unity. Such encryption may be accomplished with an RCP from one or more sources. However, the second replacement RCP may be encrypted in a differing manner from the first replacement RCP. For example, the prior second RCP, which was utilized to encrypt the first replacement RCP, may be indirectly utilized to encrypt the new string of random number (e.g., by converting the prior second RCP to a number of addresses). The addresses may correlate to those in an existing pool (e.g., the TRN pool 210 (FIG. 2), the key RCP pool 240 (FIG. 2), combinations thereof, etc.) where a key RCP may be assembled using key material elements at the random addresses derived from the conversion of the prior second RCP.

In some embodiments, the conversion of the prior second RCP to a set of addresses may be done by any suitable method, such as, for example, via fast Fourier transform (FFT) or other transform algorithms. In additional embodiments, a direct sampling method may be implemented by, for example, bit reversing the RCP and sampling the result. In such an embodiment, a sliding sample of the number of bits required for the address may be used starting on each sequential byte. In some embodiments, a sequence produced by an algorithm defining start points and/or step sizes may be implemented for the address sampling. In yet additional embodiments, a random number generator (e.g., a pseudo-random number generator (PRNG)) may be utilized to determine the number of bits required for the address. For example, portions of the RCP may be utilized (e.g., sampled) as initial parameters for the PRNG (e.g., seed values) and the resultant output from the PRNG may be utilized as random strings of addresses. In some embodiments, a proportional address may be calculated where the number of bits sampled is greater than the number required for the address.

The converted prior second RCP may be utilized in discrete portions (e.g., 8, 16, 24, 32, 40, 48, 56, 64, 128, 256, variations in between, or more bit addresses) to locate key material elements and to select those elements from a pool to define the formed key RCP. In such an embodiment, the prior second RCP is converted to a selected number of random address strings.

The server may locate the key material elements at each discrete random address to define a random key RCP that is only known to the server and another device including the same information needed to derive the same random key RCP (e.g., the prior second RCP and the pool in which the addresses are located). For example, the converted addresses string may cause the server to randomly jump or step through the targeted pool, sampling selected key material elements that are then utilized to form the key RCP. Each bit may be eventually selected as an address start point (e.g., in a select sequence or randomly) in order to provide a corresponding amount of key elements for the key RCP.

In additional embodiments, other variables (e.g., other portions of the prior second RCP) may be utilized to define other processes of stepping through the pool to develop the key RCP. For example, one or more start points and/or step sizes may be derived from the prior second RCP and utilized to randomly select key material elements to populate the key RCP.

In some embodiments, the derived values for selecting the key material elements (e.g., start values and/or step sizes) may comprise relatively prime or mutually prime integers.

In some embodiments, the key material elements defining the formed key RCP may be further transformed (e.g., via a bit reversal, other randomization methods, etc.) to assist in the conversion of the prior second RCP (e.g., in an FFT process) and/or to further obfuscate the selected key material elements.

Once developed, selected, or otherwise obtained (e.g., in a manner that is reproduceable one or more other devices sharing the synchronized pool), the key RCP may then be utilized to encrypt the second replacement RCP. In additional embodiments, the formed key RCP may not be immediately utilized and may be stored in a key pool where it may be utilized in a subsequent process of replenishment of the RCP pool.

At process block 326, the client(s) receive the encrypted second replacement RCP. As the client is synchronized, it is able to recreate the same key RCP to now decrypt the replacement RPC at process block 328. For example, where a key RCP is developed as above, the client may recreate the process (e.g., the transform to address data). Once decrypted, the second replacement RCP may be added to the RCP pool locally at the client and utilized for future operations at process block 330. The replace pointer may be advanced as above. The developed key RCP may then be retired on the server and/or the client(s) (e.g., marked as used, deleted, removed, overwritten, etc.).

As can be deduced above, in some embodiments, for every one RCP used in an encryption/decryption processes, substantially twice the size or data of key material in replacement RCPs (e.g., two RCPs, each of the same size as the one RCP) may be required in order to transfer and replace the one used RCP in a secure manner.

As noted above, in some embodiments, the transferred encrypted replacement RCPs or other RCPs may include a header with data relating to the processes to be performed on the client to maintain synchronicity.

In some embodiments, the replacement process may take place concurrently with encryption/decryption processes (e.g., in parallel as discussed above) or may take place intermittently as the RCP pools are deemed to need replenishment.

As noted above, the process may then be repeated from process block 302 where further encryption/decryption processes are being performed or may be repeated from process block 312 where only populating/replenishment processes are being performed.

For example, in additional embodiments where the key elements are being added without ongoing encryption/decryption processes (e.g., to populate an entropy server) along process blocks 312 through 330 may only be performed and looped until a desired amount of RCPs is reached.

Figure 4:
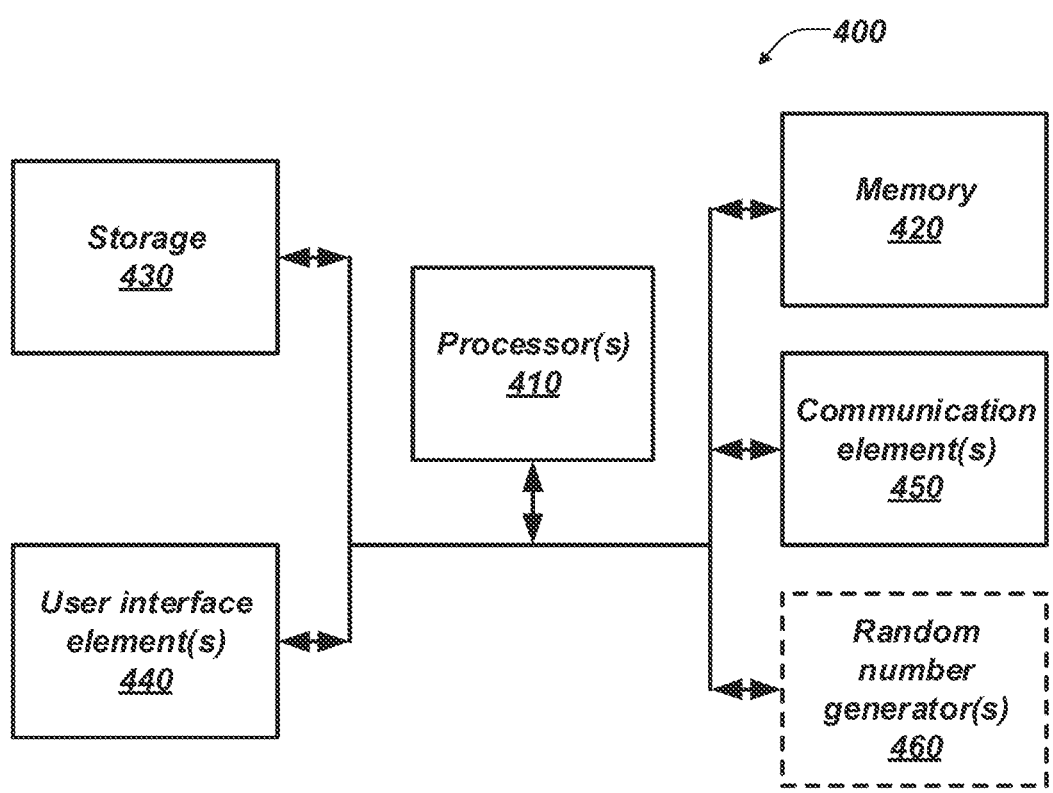
FIG. 4 is a block diagram illustrating a computing system for practicing embodiments of the present disclosure.

FIG. 4 illustrates a computing system 400 for practicing embodiments of the present disclosure. As non-limiting examples, the computing system 400 may be a user-type computer, a file server, a compute server, a notebook computer, a tablet, a handheld device, a mobile device, or other similar computing system for executing software. Computer, computing system, and server may be used interchangeably herein to indicate a system for practicing embodiments of the present disclosure. The computing system 400 is configured for executing software programs containing computing instructions and includes one or more processors 410, memory 420, storage 430, user interface elements 440, and one or more communication elements 450. Some embodiments of the computing system 400 may include one or more random number generators 460 as explained more fully above in connection with FIGS. 1 through 3.

The one or more processors 410 may be configured for executing a wide variety of operating systems and applications including computing instructions for carrying out embodiments of the present disclosure.

The memory 420 may be used to hold computing instructions, data structures, and other information for performing a wide variety of tasks including performing embodiments of the present disclosure. By way of example, and not limitation, the memory 420 may include Synchronous Random-Access Memory (SRAM), Dynamic RAM (DRAM), Read-Only Memory (ROM), flash memory, and the like.

The memory 420 may include other types of memory devices, including volatile storage devices or non-volatile storage devices, configured to store information. Examples of other types of memory 420 include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 430 may be used for storing relatively large amounts of non-volatile information for use in the computing system 400 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 400 may be presented to, and received from, a user with one or more user interface elements 440. As non-limiting examples, the user interface elements 440 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 450 may be configured for communicating with other devices or communication networks. As non-limiting examples, the communication elements 450 may include elements for communicating on wired and wireless communication media, such as for example, serial ports, parallel ports, Ethernet connections, universal serial bus (USB) connections, IEEE 1394 ("firewire") connections, lightning connections, thunderbolt connections, Bluetooth wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 430, transferred to the memory 420 for execution, and executed by the processors 410. The processors 410, when executing computing instructions configured for performing the processes, constitutes structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 430 (e.g., a computer readable storage medium), in memory 420, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage 430 or memory 420 devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) that can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the disclosure as hereinafter claimed along with their legal equivalents. In addition, features from one embodiment may be combined with features of another embodiment while still being encompassed within the scope of the disclosure as contemplated by the inventor.

What is claimed is:

1. An over-the-air updating method, applied to an update server in an internet of things system, wherein the internet of things system includes the update server and a terminal device, and the update server is communicatively connected to the terminal device, and the method includes the following steps:
   generating an encryption public key and an encryption private key that match with each other;
   sending the encryption public key to the terminal device;
   generating an update key, and encrypting the update key with the encryption private key;
   sending the encrypted update key to the terminal device upon receiving a heartbeat packet by the update server from the terminal device, through a persistent connection between the terminal device and the update server;
   sending the encrypted update key to the terminal device, to cause the terminal device to decrypt the encrypted update key with the encryption public key;
   encrypting update data with the update key; and
   sending the encrypted update data to the terminal device, to cause the terminal equipment to decrypt the update data with the decrypted update key, and perform a data updating with the update data.

2. The computer-implemented method of claim 1, further comprising:
   decrypting the second set of key data elements with the second computing system; and
   storing the second set of key data elements in the another random number pool to replace the first set of key data elements in the another random number pool.

3. The computer-implemented method of claim 1, further comprising generating the second set of key data elements with a random number generator.

4. The computer-implemented method of claim 1, further comprising selecting a third set of key data elements from the random number pool to encrypt the second set of key data elements.

5. The computer-implemented method of claim 4, further comprising:
   converting at least some of the third set of key data elements into at least one address; and
   developing a key random cypher pad (RCP) using the at least one address to locate key RCP data elements defining the key RCP.

6. The computer-implemented method of claim 5, further comprising:
   developing a fourth set of key data elements;
   storing the fourth set of key data elements in the random number pool to replace the third set of key data elements in the random number pool;
   encrypting the fourth set of key data elements with the key RCP; and
   transmitting the encrypted fourth set of key data elements.

7. The computer-implemented method of claim 1, further comprising:
   defining a use start point of the first set of key data elements with a first pointer in the random number pool; and
   moving the first pointer after utilizing the first set of key data elements to another set of key data elements of the random number pool for a subsequent encryption or decryption process.

8. The computer-implemented method of claim 7, further comprising:
   defining a replacement start point of the first set of key data elements with a second pointer in the random number pool; and
   replacing the first set of key data elements of the random number pool with the second set of key data elements starting at the second pointer.

9. A computer-implemented method for performing cryptographic procedures, comprising:
   on one or more sending devices:
      storing a first copy of a random number pool comprising key data elements of truly random numbers in a pool of individually addressable files;
      selecting a first set of key data elements from the first copy of the random number pool;
      combining clear text data elements with the first set of key data elements using an encryption operation to produce encrypted data elements;
      transmitting the encrypted data elements;
      developing a second set of key data elements;
      storing the second set of key data elements in the first copy of the random number pool to replace the first set of key data elements in the first copy of the random number pool, the storing comprising:
         defining a replacement start point of the first set of key data elements with a pointer in the random number pool; and
         replacing the first set of key data elements of the random number pool with the second set of key data elements starting at the pointer;
      encrypting the second set of key data elements; and
      transmitting the encrypted second set of key data elements; and
   on a receiving device:
      storing a second copy of the random number pool, wherein the second copy substantially matches the first copy;
      receiving the encrypted data elements;
      decrypting the encrypted data elements with a first set of key data elements from the second copy of the random number pool that matches the first set of key data elements from the first copy of the random number pool;
      receiving the encrypted second set of key data elements;
      decrypting the second set of key data elements; and
      storing the second set of key data elements in the second copy of the random number pool to replace the first set of key data elements in the second copy of the random number pool.

10. The computer-implemented method of claim 9, further comprising populating each of the first copy of the random number pool and the second copy of the random number pool with a true random number generator.

11. The computer-implemented method of claim 9, further comprising generating the second set of key data elements with a true random number generator.

12. The computer-implemented method of claim 9, wherein encrypting the second set of key data elements comprises:
converting at least some of the third set of key data elements into address locations; and
developing a key random cypher pad (RCP) using the address locations to select key RCP data elements defining the key RCP.

13. The computer-implemented method of claim 9, further comprising:
defining a use start point of the first set of key data elements in the random number pool; and
moving the use start point after utilizing the first set of key data elements to another set of key data elements of the random number pool for a subsequent encryption or decryption process.

14. A computer-implemented method for performing cryptographic procedures, comprising:
converting a first set of key data elements from a random number pool into key material element address locations;
developing a key random cypher pad (RCP) using the key material element address locations to locate key RCP material elements to define the key RCP;
developing a second set of key data elements;
providing the second set of key data elements in the random number pool to replace the first set of key data elements in the random number pool comprising:
defining a replacement start point of the first set of key data elements in the random number pool; and
replacing the first set of key data elements of the random number pool with the second set of key data elements starting at the replacement start point;
encrypting the second set of key data elements with the key RCP; and
transmitting the encrypted second set of key data elements to another computing system.

15. The computer-implemented method of claim 14, further comprising:
developing a third set of key data elements;
storing the third set of key data elements in the random number pool;
encrypting the third set of key data elements with the second set of key data elements; and
transmitting the third set of key data elements to a second computing system.

16. The computer-implemented method of claim 14, further comprising:
combining clear text data elements with the second set of key data elements using an encryption operation to produce encrypted data elements; and
transmitting the encrypted data elements to a second computing system.

17. A computing system configured for performing cryptographic procedures, the computing system comprising:
non-transitory memory configured for storing computing instructions; and
a processor operably coupled to the memory for performing the computing instructions to:
select a first set of key data elements from a random number pool on the computing system;
develop a second set of key data elements;
replace the first set of key data elements in the random number pool with the second set of key data elements comprising overwriting at least some of the first set of key data elements in the random number pool with a data element of the second set of key data elements;
encrypt the second set of key data elements with a third set of key data elements; and
transmit the encrypted second set of key data elements to another computing system.

18. The computing system of claim 17, wherein the computing instructions are further to:
combine clear text data elements with the first set of key data elements using an encryption operation to produce encrypted data elements; and
transmit the encrypted data elements to the another computing system.

19. The computing system of claim 17, further comprising the another computing system comprising the another random number pool, the another random number pool comprising a substantial copy of the random number pool on the computing system.

20. The computing system of claim 19, wherein the computing instructions are further to:
receive encrypted data elements from the another computing system; and
combine the first set of key data elements of the another random number pool with the encrypted data elements using a decryption operation for the encrypted data elements to produce clear text data elements.

21. The computing system of claim 17, wherein the computing instructions are further to:
convert at least some of the third set of key data elements into at least one address; and
develop a key random cypher pad (RCP) using the at least one address to define key RCP data elements of the key RCP.

22. The computing system of claim 21, wherein the computing instructions are further to execute one of:
develop a fourth set of key data elements;
store the fourth set of key data elements in the random number pool to replace the third set of key data elements in the random number pool;
encrypt the fourth set of key data elements with the key RCP; and
transmit the encrypted fourth set of key data elements.

* * * * *